US009183746B2

(12) United States Patent
Wu et al.

(10) Patent No.: US 9,183,746 B2
(45) Date of Patent: Nov. 10, 2015

(54) SINGLE CAMERA VIDEO-BASED SPEED ENFORCEMENT SYSTEM WITH A SECONDARY AUXILIARY RGB TRAFFIC CAMERA

(71) Applicant: Xerox Corporation, Norwalk, CT (US)

(72) Inventors: Wencheng Wu, Webster, NY (US); Edgar A. Bernal, Webster, NY (US); Robert P. Loce, Webster, NY (US); Thomas F. Wade, Rochester, NY (US); Abu Islam, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 269 days.

(21) Appl. No.: 13/795,744

(22) Filed: Mar. 12, 2013

(65) Prior Publication Data

US 2014/0267733 A1 Sep. 18, 2014

(51) Int. Cl.
*H04N 7/18* (2006.01)
*G08G 1/054* (2006.01)
*G08G 1/017* (2006.01)

(52) U.S. Cl.
CPC .............. *G08G 1/054* (2013.01); *G08G 1/0175* (2013.01)

(58) Field of Classification Search
USPC .......................................................... 348/149
See application file for complete search history.

(56) References Cited

U.S. PATENT DOCUMENTS 5,734,337 A * 3/1998 Kupersmit .................... 340/937
8,108,119 B2 * 1/2012 Southall et al. ................. 701/96
2004/0252193 A1 * 12/2004 Higgins ........................ 348/149
2011/0267460 A1 * 11/2011 Wang ............................ 348/135

OTHER PUBLICATIONS

Dufournaud et al., "Matching Images with Different Resolutions" Computer Vision and Pattern Recognition, 2000. Proceedings IEEE Conference, vol. 1, pp. 612-618.
T-EXSPEED V 2.0, http://www.kria.biz/english/products.html, accessed Feb. 11, 2013, 2 pgs.
U.S. Appl. No. 13/611,718, filed Sep. 12, 2012, W. Wu.
U.S. Appl. No. 13/527,673, filed Jun. 20, 2012, Hoover et al.
U.S. Appl. No. 13/411,032, filed Mar. 2, 2012, Kozitsky et al.
U.S. Appl. No. 13/315,032, filed Dec. 8, 2011, Maeda et al.
U.S. Appl. No. 13/414,167, filed Mar. 7, 2012, Shin et al.
U.S. Appl. No. 13/371,068, filed Feb. 10, 2012, Wu et al.

* cited by examiner

*Primary Examiner* — Dave Czekaj
*Assistant Examiner* — Leron Beck
(74) *Attorney, Agent, or Firm* — Fay Sharpe LLP

(57) ABSTRACT

When performing video-based speed enforcement a main camera and a secondary RGB traffic camera are employed to provide improved accuracy of speed measurement and improved evidentiary photo quality compared to single camera approaches. The RGB traffic camera provides sparse secondary video data at a lower cost than a conventional stereo camera. The sparse stereo processing is performed using the main camera data and the sparse RGB camera data to estimate a height of one or more tracked vehicle features, which in turn is used to improve speed estimate accuracy. By using secondary video, spatio-temporally sparse stereo processing is enabled specifically for estimating the height of a vehicle feature above the road surface.

22 Claims, 6 Drawing Sheets

SINGLE CAMERA VIDEO-BASED SPEED ENFORCEMENT SYSTEM WITH A SECONDARY AUXILIARY RGB TRAFFIC CAMERA

TECHNICAL FIELD

The presently disclosed embodiments are directed toward video-based vehicular speed law enforcement. However, it is to be appreciated that the present exemplary embodiments are also amenable to other like applications.

BACKGROUND

Conventional single camera systems are hindered by limited abilities to accurately detect vehicle speed due to limitations associated with viewing a 3D world with 2D imaging devices. Additionally, the quality of evidentiary photos provided by such systems is unsatisfactory due to the retro-reflective properties of license plates, which requires a sensor operating at high dynamic range at night. Moreover, the camera field of view (FOV) conventionally is calibrated for speed detection accuracy, which conflicts with larger FOV requirements in traffic monitoring and incident detection. The performance of systems with such wide FOV in speed estimation tasks typically exhibits a large degree of estimation error unless additional elements and/or features are included, such as multi-view capabilities, structured illumination, stereo-vision, etc. These FOV problems cannot be easily solved with a conventional speed camera. Additionally, classical video-based speed estimate systems based on a single camera exhibit performance and utility that falls short in several areas. For instance, using such systems, the estimated speed is not accurate due to ambiguities introduced by mapping a 3D scene onto a 2D image.

There is a need in the art for systems and methods that facilitate video-based speed estimation and vehicle speed limit enforcement with reduced cost and improved accuracy, while overcoming the aforementioned deficiencies.

BRIEF DESCRIPTION

In one aspect, a computer-implemented method for video-based speed estimation comprises acquiring traffic video data from a primary camera and one or more image frames from a secondary camera, preprocessing the video data acquired from the primary camera, and detecting at least one vehicle in video data acquired from the primary camera. The method further comprises tracking at least one vehicle of interest by identifying and tracking a location of one or more vehicle features across a plurality of video frames in video data acquired from the primary camera, and performing sparse stereo processing using video data of one or more tracked features within a predetermined region in the video frames from the primary camera and the one or more image frames from the secondary camera. Additionally, the method comprises estimating a height above a reference plane (e.g., a road surface or the like) of the one or more tracked features, and estimating vehicle speed based on camera calibration information and estimated feature height associated with at least one of the one or more tracked features.

In another aspect, a system that facilitates video-based speed estimation comprises a primary camera that captures video of at least a vehicle, a secondary camera that concurrently captures one or more image frames of the vehicle, and a processor configured to acquire traffic video data from the primary camera and the one or more image frames from the secondary camera. The processor is further configured to preprocess the video data acquired from the primary camera, detect at least one vehicle in video data acquired from the primary camera, and track at least one vehicle of interest by identifying and tracking a location of one or more vehicle features across a plurality of video frames in video data acquired from the primary camera. Additionally, the processor is configured to perform sparse stereo processing using video data of one or more tracked features within a predetermined region in the video frames from the primary camera and the one or more image frames from the secondary camera, estimate a height above a reference plane (e.g., a road surface or the like) of the one or more tracked features, and estimate vehicle speed based on camera calibration information and estimated feature height associated with at least one of the one or more tracked features.

In yet another aspect, a non-transitory computer-readable medium, stores computer-executable instructions for video-based speed estimation, the instructions comprising acquiring traffic video data from a primary camera and one or more image frames from a secondary camera, preprocessing the video data acquired from the primary camera, and detecting at least one vehicle in video data acquired from the primary camera. The instructions further comprise tracking at least one vehicle of interest by identifying and tracking a location of one or more vehicle features across a plurality of video frames in video data acquired from the primary camera, and performing sparse stereo processing using video data of one or more tracked features within a predetermined region in the video frames from the primary and the one or more image frames from the secondary camera. Additionally, the instructions comprise estimating a height above a reference plane (e.g., a road surface or the like) of the one or more tracked features, and estimating vehicle speed based on camera calibration information and estimated feature height associated with at least one of the one or more tracked features.

DETAILED DESCRIPTION

The above-described problem is solved by providing a video-based speed enforcement system that utilizes a main camera and a secondary traffic camera, such as a low-cost red-green-blue (RGB) camera. The described systems and methods provide improved accuracy of speed measurement and improved evidentiary photo quality compared to single camera approaches. The use of an RGB traffic camera mitigates the cost associated with a conventional stereo camera since the conventional approach requires two identical expensive primary cameras, rather than one primary and one low-cost secondary camera as proposed herein. There is also a greatly reduced computational requirement compared to conventional stereo video, which is a significant benefit in the transportation industry due to a need for real-time processing and high data rates. By using secondary video, spatio-temporally sparse stereo processing is enabled specifically for estimating the height of a vehicle feature above the road surface, which in turn enables accurate speed estimation.

The described systems and methods add a low-cost RGB traffic camera (e.g., a video camera, a still camera, etc.) to complement information obtained by the speed camera, which focuses on measuring vehicle speed. Since the RGB traffic camera is low-cost and provides a broad FOV, it is more cost-effective to use it for improving the accuracy of a lower cost, single monocular camera as a speed detector as compared to using a stand-alone and more expensive stereo camera for speed estimation in addition to the RGB traffic camera for surveillance and evidentiary photo purposes. Accordingly, the described systems and methods utilize the inexpensive RGB traffic camera for improving a single camera speed measurement without sacrificing its surveillance capability.

Relative to a system with stereo-vision for speed and a traffic camera for surveillance (e.g., 3-camera systems), the described system is more cost-effective, employing only two cameras. This advantage is achieved by re-formulating the speed measurement problem in stereo vision to form a simple feature height estimation (a constant factor) problem. Compared to the conventional monocular camera solutions, the described systems and methods are more accurate and are not limited to license plate tracking for speed.

Figure 1:
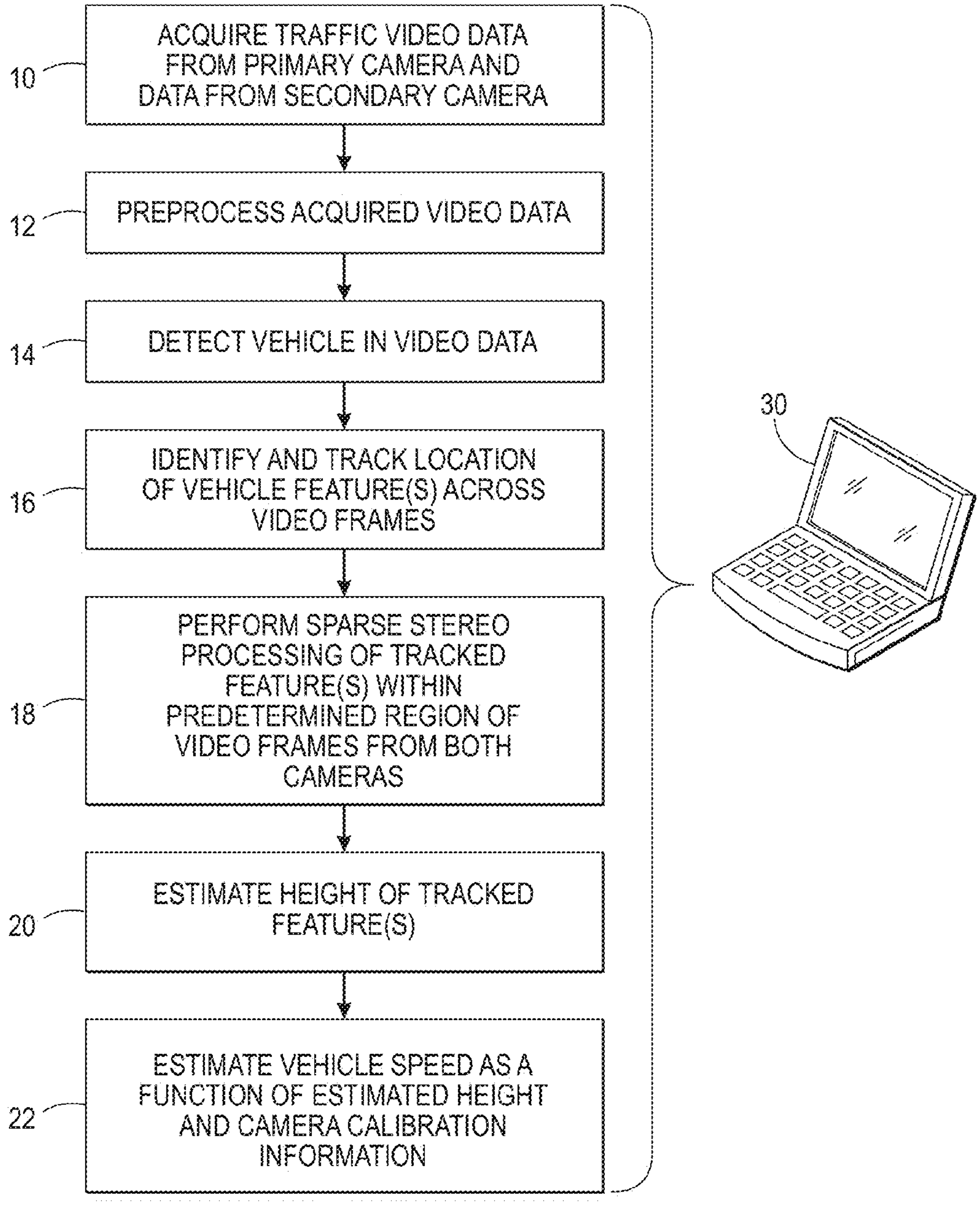
FIG. 1 illustrates a method for estimating vehicle speed using a single speed camera as a primary camera, and a low-cost secondary camera such as a red-green-blue (RGB) camera or the like to estimate vehicle feature height in order to provide a low-cost speed estimation architecture with improved accuracy over conventional systems, in accordance with one or more features described herein.

FIG. 1 illustrates a method for estimating vehicle speed using a monocular speed camera as a primary camera, and a low-cost secondary camera such as an RGB camera or the like to estimate vehicle feature height in order to provide a low-cost speed estimation architecture with improved accuracy over conventional systems, in accordance with one or more features described herein. At 10, traffic video is acquired by and/or received from a main or primary camera and video and/or still images are captured by a secondary RGB camera. At 12, video acquired by and/or received from the primary camera is preprocessed. At 14, the presence of one or more vehicles within the primary camera video is detected. In one example, at least one frame of the preprocessed video comprising the detected video is submitted to a vehicle identification module that identifies vehicles of interest. At 16, vehicles of interest are tracked by determining the location of one or more vehicle feature(s) (e.g., a license plate or the like) across frames. At 18, sparse stereo processing is performed when the tracked features are within a pre-determined region of a given frame(s). At 20, a height of the tracked feature(s) is estimated, as part of the sparse stereo processing using video from the primary camera and one or more image frames from the secondary camera. At 22, once enough tracking points and height estimations are gathered, the speed of the vehicle is estimated from camera calibration information and spatio-temporal data of the tracked points or features (including height estimates). The estimated speed information is then compared to a predetermined speed threshold and, if greater than or equal to the threshold, employed to prepare a violation package for a law enforcement entity to issue a ticket for detected speed violators. Alternatively, the estimated speed information can be compared to a predetermined speed interval, and if outside that interval, employed to prepare a violation package for a law enforcement entity to issue a ticket for detected speed violators. In another example, vehicles travelling at a speed with in a range of interest (e.g., between an upper and lower threshold) are detected and tracked.

It will be appreciated that the method of FIG. 1 can be implemented by a computer 30, which comprises a processor (such as the processor 204 of FIG. 5) that executes, and a memory (such as the memory 206 of FIG. 5) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 5), a system memory (see, e.g., FIG. 5), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
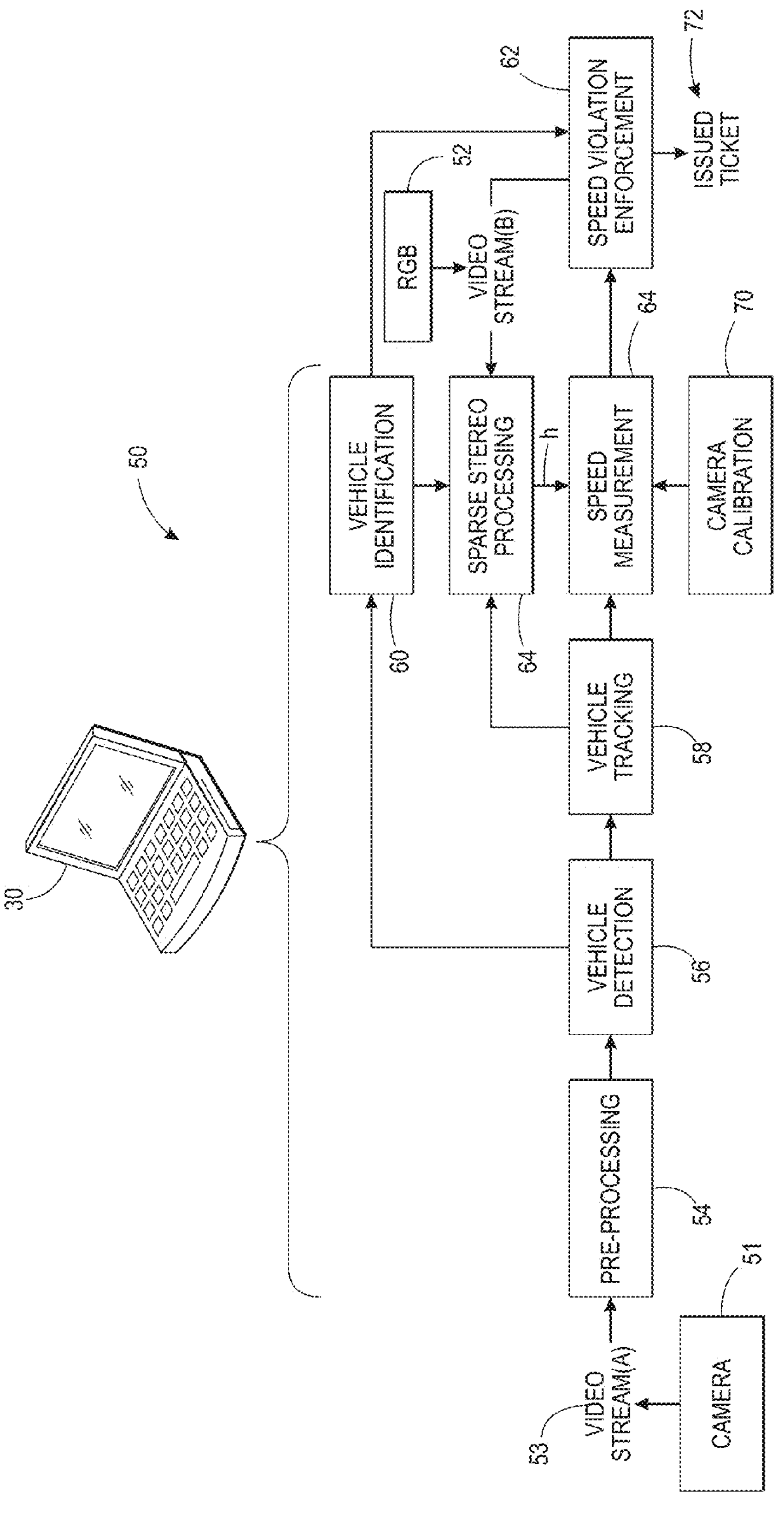
FIG. 2 illustrates a video-based speed enforcement system that utilizes a main or primary camera and a secondary (e.g. RGB) traffic camera. Traffic video is acquired and/or received from the primary camera and the secondary RGB camera.

FIG. 2 illustrates a video-based speed estimation system 50 that utilizes a main or primary camera 51 and a secondary (e.g. RGB) traffic camera 52. According to various aspects described herein, the primary camera has higher spatial and/or temporal resolution than the secondary camera. According one example, the primary camera has a resolution of at least 2 megapixels. In another example, the primary camera has a temporal resolution of at least 30 fps. Traffic video is acquired and/or received from the primary camera and video or still image frames are acquired from the secondary RGB camera. A preprocessing module 54 preprocesses video 53 (e.g., video stream A) acquired or received from the primary camera 51. For example, the preprocessing module defines a detection zone within video frames, stabilizes frames against camera shake, etc. A vehicle detection module 56 detects the presence of a vehicle within the primary camera video, forwards detected vehicle information to a vehicle tracking module 58 and submits at least one frame to a vehicle identification module 60 that identifies vehicles of interest (e.g., by the license plate). The vehicle identification module provides identification information to speed violation enforcement module 62.

The vehicle tracking module 58 tracks vehicles of interest by determining the location of one or more vehicle feature(s) (e.g., a license plate or the like) across frames. For example, the vehicle tracking module follows identified vehicle features from one frame to the next. Tracked feature information is forwarded to a speed measurement module 64, and to a sparse stereo processing module 66 which performs sparse stereo processing when the tracked features are within a predetermined region or zone in the frame(s). The sparse stereo processing module 66 uses video from the primary camera and one or more image frames from the secondary camera (video stream (A) 53 and video stream (B) 68) to estimate a height h of each tracked feature. Once tracking points are determined by the vehicle tracking module, and heights are estimated by the sparse stereo processing module, the speed estimation module 64 estimates the speed of the vehicle from camera calibration information 70 and spatio-temporal data of the tracked points or features (including height estimates). Speed estimation information (in addition to the vehicle identification information provided by the vehicle identification module from video stream A, and the video stream B from the RGB camera) is received at the speed violation enforcement module 62 for use in issuance of a citation or ticket 72 by a law enforcement entity. In one embodiment, the speed violation enforcement module prepares a violation package and/or issues a ticket for detected speed violators.

It will be appreciated that one or more modules or components of the system of FIG. 2 can be implemented by a computer, such as the computer 30 described with regard to FIG. 1.

It will be understood that in accordance with one or more aspects of the described innovation, the basic processing involved in the speed estimation process may employ known techniques, with the exception that, in contrast to conventional approaches, the height of the tracked features are determined via spatio-temporally sparse stereo processing (triangulation) on a one or more pairs of frames from both the primary speed camera 51 and the traffic RGB camera 52. Advantages of the sparse stereo processing approach described herein include better speed accuracy, better evidentiary photo quality, and the use of a low cost RGB traffic camera. Spatio-temporal sparse stereo processing is more computationally efficient than a conventional two-camera stereo-vision solution. It is also more robust than a conventional two-camera stereo-vision solution: since it only operates on distinct features (features used for tracking) rather than all features (as a typical dense stereo-vision solution does), it is less susceptible to noises. In the following discussion, the main or primary camera may be referred to as the speed camera, and the secondary or auxiliary camera may be referred to as the traffic camera or the RGB camera.

With regard to sparse stereo processing for tracked feature height estimation, a camera-based speed estimation system (single or stereo) typically includes camera calibration information that relates camera coordinates to 3-D world coordinates relative to the road surface. Both the speed camera and the RGB traffic camera can be calibrated concurrently, e.g., in the absence of traffic disturbance through the use of a vehicle travelling through the scene or FOV of the two cameras while carrying calibration targets that span the 3 dimensions of the FOVs or the like, such as is described in U.S. patent application Ser. No. 13/527,673 to Hoover et al., which is hereby incorporated by reference herein in its entirety. Given the camera models for both cameras and the knowledge of the heights of two landmarks (e.g., road surface and another object at, e.g., 3 ft above the road or some other predetermined height), it can be shown that a feature height h can be computed by:

$$(h-h_1)M_{h_1}\left(\begin{bmatrix} i \\ j \end{bmatrix}\right)+(h_2-h)M_{h_2}\left(\begin{bmatrix} i \\ j \end{bmatrix}\right)=(h-h_1)M'_{h_1}\left(\begin{bmatrix} i' \\ j' \end{bmatrix}\right)+(h_2-h)M'_{h_2}\left(\begin{bmatrix} i' \\ j' \end{bmatrix}\right) \quad (1)$$

Here, $M_{h1}$, $M_{h2}$ are camera models for the speed camera of the landmarks at heights $h_1$ and $h_2$, $M'_{h1}$, $M'_{h2}$ are camera models of the RGB traffic camera of landmarks at heights $h_1$ (e.g., 0) and $h_2$ (e.g., 3), (i j) is the pixel position of the tracked feature in the image in speed camera coordinates, and (i' j') is the pixel position of the tracked feature in the image in RGB traffic camera coordinates. All values are known once the camera calibration is performed and pixel correspondence for the feature has been found from the stereo pair (the correspondence problem determines (i' j') given (i j) as explained below). Since there are two equations and one unknown, the system can be solved via a conventional least squares solution, which is robust against noise. In one example, sparse stereo processing comprises performing height estimation by identifying a least square solution that is a function of camera calibration and orientation information, estimating the feature height multiple times using a plurality of stereo feature pairs, and processing the estimated heights statistically by computing one or more of an average height, a median height, a mean height, and a truncated mean height.

For feature height estimation, the processing occurs at the speed camera end. As a tracking point located at coordinates (i j) in the speed camera image plane enters the tracked feature height estimation zone or region within a given frame of video stream (A), the corresponding image template (e.g., the cropped image of a license plate from the speed camera video stream) is used to find the correspondence (i' j') in the corresponding RGB frame. Since there are two different cameras (i.e., with different spatial resolutions and FOVs), the matching method needs to be invariant to scale and potentially projective distortions. Therefore, a matching technique such as scale invariant feature transform (SIFT), Speeded Up Robust Features (SURF), or Gradient Location and Orientation Histogram (GLOH) can be employed. Alternatively, one can apply matching technique at multiple scales using features that are not scale invariant in nature, such as correlations of image intensities (used by Harris Corners), Histogram of Oriented Gradients (HOG), local binary patterns (LBP) etc. This may be computationally more expensive but will enable scale-invariant matching for objects that are described with scale-variant features. Once the corresponding pixel locations of the tracked feature have been identified on both cameras, the height of the tracked feature can be estimated using Eq. (1). Multiple height estimations across multiple frames are calculated until the tracked points exit the tracked feature height estimation zone, and an estimated feature height is computed by averaging the individual estimates. The tracking continues until the vehicle exits the FOV of the speed camera but the feature height estimation can stop after sufficient measurements are made (as defined by the length of the height estimate region). This estimated feature (e.g., license plate) height is then used to fine tune the raw speed estimated by the single speed camera for better accuracy.

A typical stereovision system involves at least two cameras seeing a segment of common/overlapping scene. One of the goals of stereovision is to resolve the 3D-to-2D ambiguities that a single 2D camera cannot resolve. That is, in the context of speed detection, a single camera provides two-dimensional feature locations (x,y), while a stereo camera has the capability to provide three-dimensional information (x,y,z) (where z typically denotes depth). Unless the height of the tracked vehicle features can be estimated accurately by some other means, the speed measurement from a conventional monocular camera system is not as accurate as that from a stereo-camera (all other factors such as sensor noise, placement of cameras, illumination, camera shake etc. being equal). Though stereo-vision provides depth information and is thus more appropriate for 3D world imaging applications, the depth estimation performance is not uniform throughout the space. The depth resolution and the amount of overlap in the two camera views are dependent on the relative positions between the cameras, sensor resolutions, and their focal lengths.

Figure 3A:
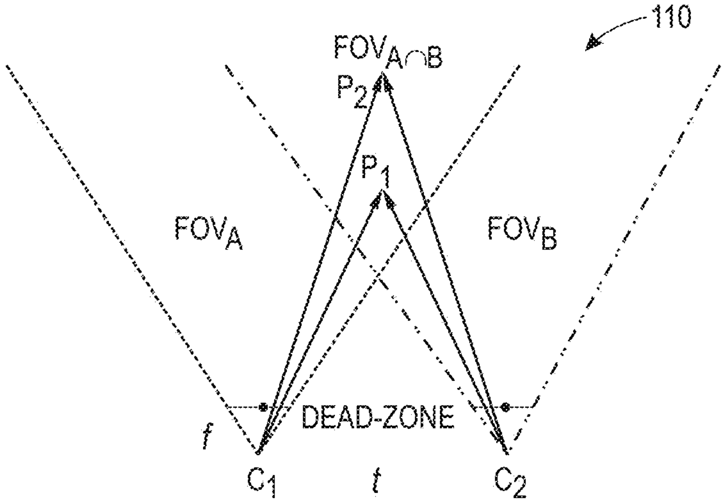
FIG. 3A shows a diagram of a symmetric stereo system where both cameras have identical sensor resolutions and focal lengths.
Figure 3B:
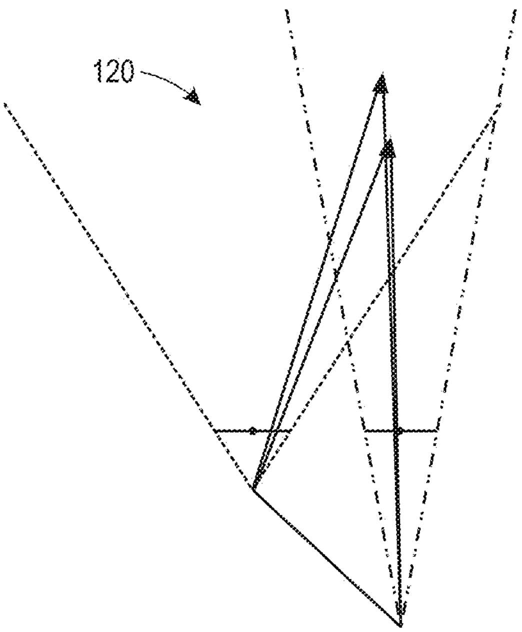
FIG. 3B shows a diagram of an asymmetric stereo system where both cameras have different focal lengths.

To illustrate this, FIG. 3A shows a diagram 110 of a symmetric stereo system where both cameras have identical sensor resolutions and focal lengths. FIG. 3B shows a diagram 120 of an asymmetric stereo system where both cameras with different focal lengths. The diagrams from FIGS. 3A and 3B illustrate the "triangulation" problem for determining the (x,y,z) spatial coordinates of a point $P_1$ with two views (sensor points $C_1$, and $C_2$). As shown in FIG. 3A, the distance between the centers of the two cameras, t, the common focal length, f, and the orientation of each of the cameras, all determine the sizes of the overlapped region, $FOV_{A \cap B}$, and of the dead zone. It is well known in stereo vision that the depth of point $P_1$ is z=ft/d, where d is the pixel disparity of the image of $P_1$ on the 2 sensors (the disparity amount between the intersection of the imaging plane of camera 1 and $C_1P_1$ and the intersection of imaging plane of camera 2 and $C_2P_1$, that is, the relative displacement between the images of $P_1$ on both camera sensors). As illustrated in FIG. 3A, $P_2$ has smaller disparity than $P_1$ since it is farther away from the stereo camera. Since camera resolution (i.e., number of pixels in row and column) is finite and discrete, the implication of this inverse proportional property is that the depth resolution is greater for objects that are closer to the camera (while still outside of dead-zone and inside the overlap region) than for objects that are farther away. Also, as t or f increase, the depth resolution increases but the size of the overlapping region decreases. FIG. 3B illustrates a more complicated case where the focal lengths of the cameras in the stereo system are different. These are some of the well-known trade-offs in stereo-vision that need to be taken into account if one were to design an asymmetric stereo camera system for speed detection. As a result, it is often preferred to use identical cameras with identical settings (i.e. as shown in FIG. 3A) and optimize the configuration based on the operation range and the available infrastructure (height of the mounting pole for example). As a side effect, these optimized stereo-vision speed cameras would be less suitable for other typical traffic monitoring applications.

Figure 4:
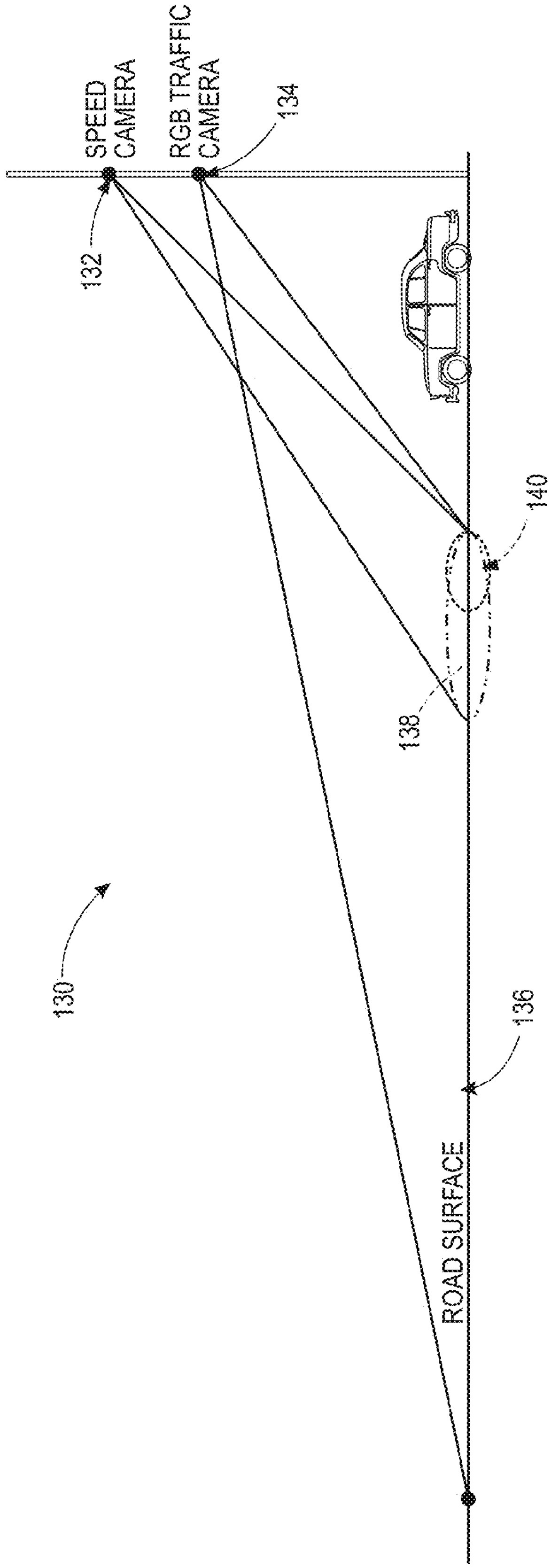
FIG. 4 illustrates a diagram of a video-based vehicle speed enforcement architecture, in accordance with one or more aspects described herein.

FIG. 4 illustrates a diagram 130 of a video-based vehicle speed enforcement architecture, in accordance with one or more aspects described herein. A speed camera 132 (e.g., a primary camera) is mounted on a pole above a traffic camera 134 (e.g., a secondary camera such as an RGB camera, a black-and-white camera, etc.). Both cameras 132, 134 are directed toward a road surface 136 and have overlapping fields of view (FOVs). A stereo region 138 represents a region in which the FOVs of the two cameras overlap. A tracked feature height estimation zone 140, a subset of zone 138, is also shown, and represents a region or zone of a video scene in which estimation of tracked feature height is performed.

The overlapping of the FOVs can be optimized while imposing few constraints on the FOV of the RGB traffic camera which results in a small area of overlap, where stereo performs robustly (as opposed to attempting to obtain stereo vision to perform well in a larger portion of the overlap region). In FIG. 4, the region 140 represents the location of the feature height estimation zone. It corresponds to the nearest portion of the overlapping stereo field between the cameras. Mounting the speed camera 132 above the traffic camera is advantageous because the accuracy of speed measurement from a single camera improves with camera height (i.e., noise is reduced), and because mounting the RGB camera 134 lower and at a shallower angle results in improved FOV for traffic monitoring.

It will be understood that stereo vision processing may include, for example, determining epi-polar lines, i.e. the search region for the stereo correspondence problem. The corresponding pixels in each pair of images (i.e., from the primary and secondary cameras) are matched, given a constraint introduced by the determined epi-polar lines. That is, the potential matches are only searched around the epi-polar lines. In this manner, a dense depth map for all pixels in the overlapping FOV (referred as stereo region) is achieved. This approach can also be used to derive sparse depth information, i.e. the depth information for selected feature points. In one example, feature points on the stereo pair of images or frames are first identified independently on each image and then linked together according to the correspondence between them. Point detectors of interest, such as SIFT, SURF, or various corner detectors such as Harris corners, Shi-Tomasi corners, Smallest Univalue Segment Assimilating Nucleus (SUSAN) corner etc. can be applied to find the feature points. The correspondence problem can be solved via one or more of interest point matching and local searches under the epi-polar constraint. It will be noted that, according to one example, processing from the speed camera sequence can identify the set of feature points that are suitable for tracking. Tracked feature points are useful for stereo matching since good tracking points have certain texture and/or corner properties that are desirable for identifying stereo matches. The correspondence problem is spatially sparse since only the 3D coordinates of a small set of points are typically recovered, and temporally sparse since it only occurs when vehicles of interest traverse the height estimation zone 140. For regular stereo-vision applications, the depth measurements of these sparse points are interpolated and propagated to all pixels in the stereo regions (e.g., by multi-resolution and having a predetermined number of points of interest) and across a plurality of video frames. In the case of speed measurement, the spatial coordinates (x,y,z) of the tracked feature points are sufficient.

For a typical stereo-vision speed camera, the (x,y,z) point coordinates across a given number of frames is converted to road (e.g., real-world) coordinates so that speed in standard units such as miles-per-hour (mph) can be calculated. A calibration process that maps pixel values into real-world coordinates facilitates the conversion. The calibration process may be referred to as an extrinsic calibration. As previously described, the quality of the estimation of the spatial coordinates (x,y,z) of a point depends at least in part on its location within the stereo region.

In the described systems and methods, an optimal tradeoff is achieved by using stereo vision for tracked feature height estimation (e.g., license plate height) across the highlighted tracked feature height estimation zone 140. Since the speed camera measurement system identifies feature points to track with constant but unknown height above the road surface 136, all that is needed from the auxiliary RGB traffic camera 134 is video data to aid the computation of said unknown (but constant) value. In the case where the tracked height is constant, only a single pair of images of the vehicle at some optimal location is needed (e.g., the first time the vehicle enters the scene in FIG. 4). For improved accuracy and robustness to external noise, the process is performed iteratively while the tracked features are still within the tracked feature height estimation zone 140. A traditional height estimation procedure would use sparse stereo vision techniques to compute the 3D coordinates (x,y,z) of the tracked feature, and then use the extrinsic calibration information to convert the camera coordinates to real-world coordinates from which a height estimate can be extracted. However, the described systems and methods use a different triangulation method (discussed below) that aligns better with the single camera speed measurement approach already in place.

Derivation of tracked feature height estimation using sparse stereo-vision processing involves an approach for estimating the height of a feature of an object (e.g. a vehicle) traveling on a reference plane (e.g. road surface) using two cameras. Given four camera models $M_{h1}$, $M_{h2}$, $M'_{h1}$, $M'_{h2}$ with common (x,y,h) coordinate relative to the road surface and a pair of pixel correspondence (i,j) and (i',') it can be shown that:

$$\begin{bmatrix} x_{h_1} \\ y_{h_1} \end{bmatrix} = M_{h_1}\left(\begin{bmatrix} i \\ j \end{bmatrix}\right) \quad \begin{bmatrix} x_{h_2} \\ y_{h_2} \end{bmatrix} = M_{h_2}\left(\begin{bmatrix} i \\ j \end{bmatrix}\right) \tag{2}$$

$$\begin{bmatrix} x'_{h'_1} \\ y'_{h'_1} \end{bmatrix} = M'_{h'_1}\left(\begin{bmatrix} i \\ j \end{bmatrix}\right) \quad \begin{bmatrix} x'_{h'_2} \\ y'_{h'_2} \end{bmatrix} = M'_{h'_2}\left(\begin{bmatrix} i \\ j \end{bmatrix}\right) \tag{3}$$

Here, the four camera models correspond to the primary camera at two heights, $h_1$, $h_2$, and the secondary camera at two heights, $h'_1$, $h'_2$, respectively. A pair of pixel correspondence above means the pixel locations in the primary camera image or frame and in the secondary camera image or frame of the same point of an object. Looking at Eq. (2), it will be understood that for a point (i,j) in the primary camera frame it is not possible to know its true location (x,y) without knowing whether it is at height $h_1$ or $h_2$ or some other height. Similarly, it is not possible to resolve the ambiguity for (i',j') by looking at Eq. (3) alone. It is however possible to resolve the ambiguity if it is known that (i,j) and (i',j') are physically the same point (i.e. their true (x,y) is the same).

Assuming the camera projection mapping (e.g., camera models at various heights) is linear along the height axis, it can be shown that for a point at (x,y,h) the following equation can be satisfied:

$$\begin{bmatrix} x \\ y \end{bmatrix} = \alpha \begin{bmatrix} x_{h1} \\ y_{h_1} \end{bmatrix} + (1-\alpha) \begin{bmatrix} x_{h_2} \\ y_{h_2} \end{bmatrix}, \quad \alpha = \frac{h-h_1}{h_2-h_1} \tag{4}$$

When solving the tracked-feature height problem, given a pair of image plane correspondences, (i,j) and (i',j') of a tracked feature at unknown height h from the two cameras, its real-world coordinate (x,y) satisfies $$\begin{bmatrix} x \\ y \end{bmatrix} = \alpha \begin{bmatrix} x_{h_1} \\ y_{h_1} \end{bmatrix} + (1-\alpha) \begin{bmatrix} x_{h_2} \\ y_{h_2} \end{bmatrix}, \quad \alpha = \frac{h-h_1}{h_2-h_1} \tag{5}$$

$$\begin{bmatrix} x \\ y \end{bmatrix} = \beta \begin{bmatrix} x'_{h'_1} \\ y'_{h'_1} \end{bmatrix} + (1-\beta) \begin{bmatrix} x'_{h'_2} \\ y'_{h'_2} \end{bmatrix}, \quad \beta = \frac{h-h'_1}{h'_2-h'_1} \tag{6}$$

Setting Eq. (5) equal to Eq. (6) and substituting the two-camera calibration models in equations (2) and (3), it can be shown that h satisfies:

$$\frac{h-h_1}{h_2-h_1} M_{h_1}\left(\begin{bmatrix} i \\ j \end{bmatrix}\right) + \frac{h_2-h}{h_2-h_1} M_{h_2}\left(\begin{bmatrix} i \\ j \end{bmatrix}\right) = \frac{h-h'_1}{h'_2-h'_1} M'_{h'_1}\left(\begin{bmatrix} i' \\ j' \end{bmatrix}\right) + \frac{h'_2-h}{h'_2-h'_1} M'_{h'_2}\left(\begin{bmatrix} i' \\ j' \end{bmatrix}\right) \tag{7}$$

Further simplification of the two-camera model to force $h_1=h'_1$, $h_2=h'_2$, shows that Eq. (7) can be simplified to:

$$(h-h_1) M_{h_1}\left(\begin{bmatrix} i \\ j \end{bmatrix}\right) + (h_2-h) M_{h_2}\left(\begin{bmatrix} i \\ j \end{bmatrix}\right) = (h-h_1) M'_{h_1}\left(\begin{bmatrix} i' \\ j' \end{bmatrix}\right) + (h_2-h) M'_{h_2}\left(\begin{bmatrix} i' \\ j' \end{bmatrix}\right) \tag{8}$$

There are two equations and only one unknown in Eq. (8). Therefore, h can be calculated using a least square solution. Additionally, multiple such pairs can be acquired and used to solve for h as the tracked object appears in both views (i.e. the fields of view of the primary and secondary cameras) to yield an even more robust solution.

Figure 5:
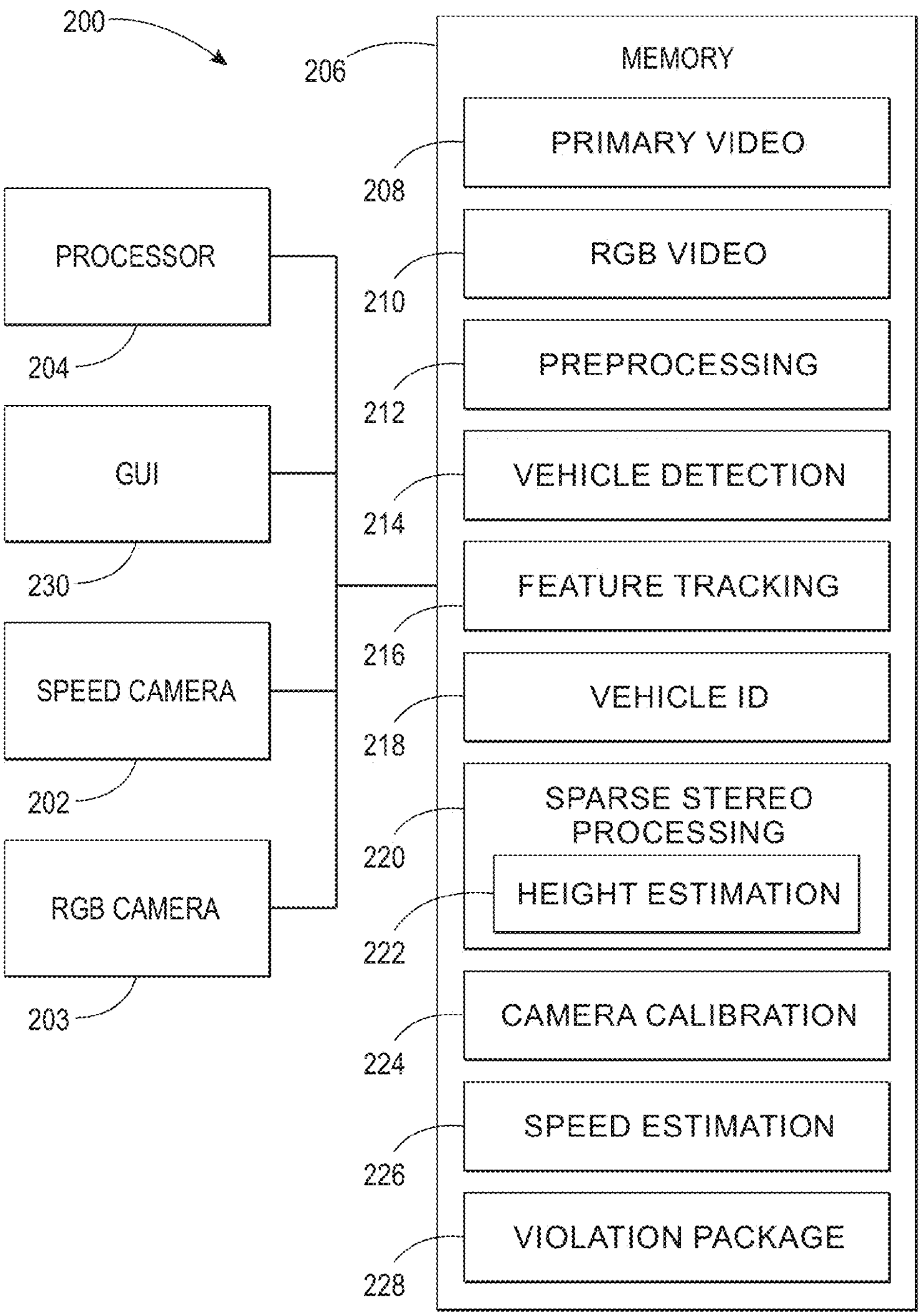
FIG. 5 illustrates a system that facilitates vehicle speed measurement with improved accuracy, in accordance with one or more aspects described herein.

FIG. 5 illustrates a system 200 that facilitates vehicle speed measurement with improved accuracy, in accordance with one or more aspects described herein. The system is configured to perform the method(s), techniques, etc., described herein with regard to the preceding figures, and comprises a primary camera 202 and a secondary camera 203, which are coupled to a processor 204 that executes, and a memory 206 that stores, computer-executable instructions for performing the various functions, methods, techniques, steps, and the like described herein. The camera 202 may be a stationary speed measurement camera or any other suitable camera for recording video of passing vehicles. The secondary camera 203 may be an RGB camera, a black and white camera, or any other suitable low-cost camera that can provide additional information that is used to augment the speed measurement information gleaned from the primary camera video stream. The processor 204 and memory 206 may be integral to each other or remote but operably coupled to each other. In another embodiment, the processor and memory reside in a computer (e.g., the computer 30 of FIG. 1) that is operably coupled to the camera 202 and RGB camera 203.

As stated above, the system 200 comprises the processor 204 that executes, and the memory 206 that stores one or more computer-executable modules (e.g., programs, computer-executable instructions, etc.) for performing the various functions, methods, procedures, etc., described herein. "Module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

According to FIG. 5, primary video 208 is acquired by the primary camera 202 and stored in the memory. Concurrently, secondary video 210 is acquired by the RGB camera 203 and stored in the memory. A preprocessing module 212 preprocesses the primary video 208, e.g., by defining a detection zone (such as the zone 138 of FIG. 4) within video frames. The preprocessing module also stabilizes frames against camera shake, etc. A vehicle detection module 214 detects the presence of a vehicle within the primary camera video detection zone, forwards detected vehicle information to a feature tracking module 216 and submits at least one video frame (e.g., a frame including a vehicle in the detection zone) to a vehicle identification module 218 that identifies vehicles of interest (e.g., by the license plate). The vehicle identification module forwards identification information to speed violation enforcement module 228.

The feature tracking module 216 tracks vehicles of interest by determining the location of one or more vehicle feature(s) (e.g., a license plate or the like) across frames. For example, the feature tracking module follows identified vehicle features from one frame to the next in the primary video stream. Tracked feature information is forwarded to a speed estimation module 226, and to a sparse stereo processing module 220 that performs sparse stereo processing when the tracked features are within a pre-determined region or zone (e.g., a tracked feature zone such as zone 140 in FIG. 4) in the frame(s). The sparse stereo processing module 220 includes a height estimation module 222 that uses video 208, 210 from both cameras to estimate a height h of each tracked feature. Once tracking points are collected by the feature tracking module, and heights are estimated by the sparse stereo processing module, the speed estimation module 226 estimates the speed of the vehicle from camera calibration information 224 and spatio-temporal data of the tracked points or features (including height estimates). Speed estimation information (in addition to the secondary video data 210 and the vehicle identification information provided by the vehicle identification module from the primary video data 208) is collected to generate a speed violation package 228, which can be used by a law enforcement entity to issue a citation or ticket. In one embodiment, the speed violation package includes a citation or ticket which can be directly transmitted (e.g., mailed, emailed, etc.) to the violator or can be transmitted to a law enforcement entity for review, verification, validation, etc.

Additionally, the system 200 can include a graphical user interface (GUI) 230 via which a user may enter information and on which information is presented to the user. For instance, a technician or law enforcement personnel can be presented with video data, height and/or speed estimation information, vehicle ID information, violation package(s), or any other suitable information.

The following example is provided for illustrative purposes to show the manner in which the described system(s) may be calibrated. The example focuses on the accuracy of the feature height estimation capabilities of the proposed sparse stereo-vision system. In the example a parking lot is imaged from the $2^{nd}$ floor of a building (e.g., about 100 ft away and 15 ft height above the ground). In this example, the cameras are horizontally (rather than vertically) displaced by 12 ft due to space constraints, although one skilled in the art will understand that the same principles apply to vertically mounted cameras, as described with regard to the preceding figures. It will be noted that the working distance can be any suitable distance (e.g., between 25 ft and 50 ft away from the tracked feature height estimation zone) and is not limited to the tested 100 ft distance imposed by the testing conditions. In any case, scaling all tested lengths and working distance down by a factor of 4 (e.g., from 100 ft to 25 ft) provides results consistent with those of an operational vertically mounted system.

Figure 6:
FIG. 6 shows an image that mimics the FOV of a (primary) monocular speed camera.
Figure 7:
FIG. 7 shows an image that mimics the FOV of a (secondary) traffic camera.

Example views from two cameras under this highly constrained test are shown in FIGS. 6 and 7, where FIG. 6 shows an image 250 that mimics the FOV of a monocular speed camera while FIG. 7 shows an image 270 that mimics the FOV of a traffic camera (e.g., a secondary RGB camera or the like). In this example, a camera calibration stage was executed using the two-step method described above. As a reference, intrinsic calibration was performed by imaging a checkerboard (or similar) targets of known dimensions, while extrinsic camera calibration was performed by fitting a model to a set of known camera locations and rotations relative to physically measured landmarks on the ground (e.g., the corners of parking space and zebra crossing in FIGS. 6 and 7). Once the cameras were calibrated, multiple pictures of the scene were acquired, a few interest points were manually selected, and heights of the points of interest were measured relative to the ground. Given those manually established pixel correspondences, the accuracy of feature height estimation was verified using the techniques described above. The results are shown in Table 1.

TABLE 1

Feature height estimation accuracy using sparse stereo processing.

| | Truth (inches) | Repeat#1 | Repeat#2 | Repeat#3 | errors1 | errors2 | errors3 |
|---|---|---|---|---|---|---|---|
| Honda rear plate upper corner | 35.5 | 36 | 34.8 | 34.8 | 0.5 | −0.7 | −0.7 |
| BMW front plate upper corner | 20 | 18 | 18 | 18 | −2 | −2 | −2 |
| traffic cone#1 | 18.5 | 20.4 | 21.6 | 20.4 | 1.9 | 3.1 | 1.9 |
| traffic cone#2 | 18.5 | 16.8 | 18 | 16.8 | −1.7 | −0.5 | −1.7 |
| Parking space corner | 0 | 4.8 | 3.6 | 4.8 | 4.8 | 3.6 | 4.8 |
| No Parking Sign | 44 | 42 | 43.2 | 42 | −2 | −0.8 | −2 |

The performance statistics are (min,max)=(−2",4.8"), (ave, std)=(0.25",2.39"), P95=6.8". A conventional approach (e.g., such as is described in U.S. patent application Ser. No. 13/411,032 to Kozitsky et al., which is hereby incorporated by reference in its entirety herein) yielded, e.g., an accuracy of (min,max)=(−8.1",16.5"), (ave,std)=(0.26",3.96"), P95=15.1", whereas the herein described method is more accurate (~8" improvement in P95 or 1.5" improvement in standard-deviation), even under the limited experimental conditions. It will be appreciated that while the conventional approach was tested more extensively (more iterations), the target features consisted of 5 to 6 distinct license plates with heights ranging from 24.5" to 43". On the other hand, using the herein described method, fewer iterations need be performed while still addressing a wider range of feature heights, ranging from 0" to 44". Moreover, the conventional method exhibits a few failure modes that the herein described method overcomes: first, the conventional method only works for license plates (as it performs height estimation from measured license plate character heights), and second, its accuracy decreases with external noise factors affecting the appearance of the license plate (e.g. snow, frames around the license plate, etc.).

The exemplary embodiments have been described. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for video-based speed estimation, comprising:
  - acquiring traffic video data from a primary camera and acquiring one or more image frames from a secondary camera;
  - preprocessing the video data acquired from the primary camera;
  - detecting at least one vehicle in video data acquired from the primary camera;
  - tracking the at least one vehicle of interest by identifying and tracking a location of one or more vehicle features across a plurality of video frames in video data acquired from the primary camera;
  - performing sparse stereo processing using video data of one or more tracked features within a predetermined region in the video frames from the primary camera and the one or more image frames from the secondary camera;
  - estimating a height of the one or more tracked features relative to a reference plane;
  - estimating vehicle speed as a function of camera calibration information and estimated feature height associated with at least one of the one or more tracked features;
  - wherein sparse stereo processing comprises performing height estimation by:
    - identifying a least square solution that is a function of camera calibration and orientation information;
    - estimating the feature height multiple times using a plurality of stereo feature pairs; and
    - processing the estimated heights statistically by computing one or more of an average height, a median height, a mean height, and a truncated mean height.

2. The method according to claim 1, further comprising preparing a violation package including a citation for a vehicle having an estimated speed that is greater than or equal to a predetermined speed threshold.

3. The method according to claim 2, further comprising transmitting the violation package to a law enforcement entity for validation.

4. The method according to claim 1, wherein the secondary camera is one of a red-green-blue (RGB) camera and a black and white camera.

5. The method according to claim 4, wherein the secondary camera is a video camera, and the one or more image frames are extracted from video captured by the secondary camera.

6. The method according to claim 1, wherein detecting at least one vehicle in the video data acquired from the primary camera further comprises submitting at least one frame of video data to a vehicle identification module that identifies the at least one vehicle.

7. The method according to claim 1, wherein the one or more tracked features of each vehicle comprises a license plate of the vehicle.

8. The method according to claim 7, further comprising identifying a given vehicle by the license plate of the vehicle, and including vehicle license plate information in a violation package that is transmitted to a law enforcement entity for use in issuing a citation to an owner of the identified vehicle.

9. The method according to claim 1, wherein the one or more tracked features comprises one or more of a scale invariant feature transform (SIFT), speeded up robust features (SURF), a gradient location and orientation histogram (GLOH), Harris corners, a histogram of oriented gradients (HOG), and local binary patterns (LBP).

10. A processor configured to execute computer-executable instructions for performing the method of claim 1, the instructions being stored on a non-transitory computer-readable medium.

11. A system that facilitates video-based speed enforcement, comprising:
  - a primary camera that captures video of vehicle;
  - a secondary camera that concurrently captures one or more image frames of the vehicle; and
  - a processor configured to:
    - acquire traffic video data from the primary camera and acquire the one or more image frames from a secondary camera;

preprocess the video data acquired from the primary camera;

detect at least one vehicle in video data acquired from the primary camera;

track the at least one vehicle of interest by identifying and tracking a location of one or more vehicle features across a plurality of video frames in video data acquired from the primary camera;

perform sparse stereo processing using video data of one or more tracked features within a predetermined region in the video frames from the primary camera and the one or more image frames from the secondary camera;

estimate a height of the one or more tracked features relative to a reference plane;

estimate vehicle speed as a function of camera calibration information and estimated feature height associated with at least one of the one or more tracked features;

wherein the processor is further configured to perform the sparse stereo processing and height estimation by:

identifying a least square solution that is a function of camera calibration and orientation information;

estimating the feature height multiple times using a plurality of stereo feature pairs; and processing the estimated heights statistically by computing one or more of an average height, a median height, a mean height, and a truncated mean height.

12. The system according to claim 11, wherein the processor is further configured to prepare a violation package including a citation for a vehicle having an estimated speed that is greater than or equal to a predetermined speed threshold.

13. The system according to claim 12, wherein the processor is further configured to transmit the violation package to a law enforcement entity for validation.

14. The system according to claim 11, wherein the secondary camera is one of a red-green-blue (RGB) camera and a black and white camera.

15. The system according to claim 11, wherein the secondary camera is a video camera, and the one or more image frames are extracted from video captured by the secondary camera.

16. The system of claim 11, further comprising a vehicle identification module to which the processor submits at least one frame of video data to a vehicle identification module that identifies the at least one vehicle in order to detect at least one vehicle in the video data acquired from the primary camera.

17. The system according to claim 11, wherein the one or more tracked features of each vehicle comprises a license plate of the vehicle.

18. The system according to claim 17, wherein the processor identifies a given vehicle by the license plate of the vehicle, and includes vehicle license plate information in a violation package that is transmitted to a law enforcement entity for use in issuing a citation to an owner of the identified vehicle.

19. The system according to claim 11, wherein the one or more tracked features comprises one or more of a scale invariant feature transform (SIFT), speeded up robust features (SURF), a gradient location and orientation histogram (GLOH), Harris corners, a histogram of oriented gradients (HOG), and local binary patterns (LBP).

20. A non-transitory computer-readable medium having stored thereon computer-executable instructions for video-based speed estimation, the instructions comprising:

acquiring traffic video data from a primary camera and acquiring one or more image frames from a secondary camera;

preprocessing the video data acquired from the primary camera;

detecting at least one vehicle in video data acquired from the primary camera;

tracking the at least one vehicle of interest by identifying and tracking a location of one or more vehicle features across a plurality of video frames in video data acquired from the primary camera;

performing sparse stereo processing using video data of one or more tracked features within a predetermined region in the video frames from the primary camera and the one or more image frames from the secondary camera;

estimating a height of the one or more tracked features relative to a reference plane; and estimating vehicle speed as a function of camera calibration information and estimated feature height associated with at least one of the one or more tracked features;

wherein sparse stereo processing comprises performing height estimation by:

identifying a least square solution that is a function of camera calibration and orientation information;

estimating the feature height multiple times using a plurality of stereo feature pairs; and processing the estimated heights statistically by computing one or more of an average height, a median height, a mean height, and a truncated mean height.

21. The computer-readable medium of claim 20, further comprising preparing a violation package including a citation for the vehicle having an estimated speed that is greater than or equal to a predetermined speed threshold.

22. The computer-readable medium of claim 20, wherein the primary camera is a video camera and the secondary camera is one of a red-green-blue (RGB) camera and a black and white camera.

* * * * *